(12) United States Patent
Inoue

(10) Patent No.: US 6,502,186 B2
(45) Date of Patent: Dec. 31, 2002

(54) INSTRUCTION PROCESSING APPARATUS

(75) Inventor: Aiichiro Inoue, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/739,800

(22) Filed: Dec. 20, 2000

(65) Prior Publication Data

US 2001/0004756 A1 Jun. 21, 2001

Related U.S. Application Data

(63) Continuation of application No. PCT/JP99/02178, filed on Apr. 23, 1999.

(30) Foreign Application Priority Data

Jul. 7, 1998 (JP) ............................................ 10-191900

(51) Int. Cl.⁷ ................................................. G06F 9/46
(52) U.S. Cl. ...................................... 712/217; 712/218
(58) Field of Search ................................ 712/217, 218, 712/23

(56) References Cited

U.S. PATENT DOCUMENTS

| | | | | |
|---|---|---|---|---|
| 4,521,851 A | | 6/1985 | Trubisky et al. ............ 712/218 |
| 5,655,096 A | * | 8/1997 | Branigin .................... 712/200 |
| 5,790,827 A | * | 8/1998 | Leung ....................... 712/216 |
| 5,802,588 A | * | 9/1998 | Ramagopal ................. 711/156 |
| 5,878,245 A | * | 3/1999 | Johnson ..................... 711/154 |
| 5,887,152 A | * | 3/1999 | Tran ......................... 712/217 |
| 6,061,777 A | * | 5/2000 | Cheong et al. ............. 712/205 |
| 6,134,645 A | | 10/2000 | Nguyen ...................... 712/23 |
| 6,141,745 A | * | 10/2000 | Pickett ...................... 712/204 |
| 6,209,073 B1 | * | 3/2001 | Okpisz et al. .............. 711/167 |

FOREIGN PATENT DOCUMENTS

| | | |
|---|---|---|
| JP | 53-7151 | 1/1978 |
| JP | 54-21150 | 2/1979 |
| JP | 59-91546 | 5/1984 |
| JP | 2-79122 | 3/1990 |
| JP | 2-82318 | 3/1990 |
| JP | 8-179946 | 7/1996 |
| JP | 8-263289 | 10/1996 |
| JP | 2000-20307 | 1/2000 |

* cited by examiner

Primary Examiner—Eric Coleman
(74) Attorney, Agent, or Firm—Staas & Halsey LLP

(57) ABSTRACT

An apparatus stores data corresponding to each type of instruction for each instruction, and includes: an information reservation station unit for performing integral control containing a resource updating process performed when the instruction is completely executed; and one or more function reservation station units for storing data corresponding to the function relating to the execution of the instruction, and controlling the execution of the function under the integral control of the instruction reservation station unit.

8 Claims, 19 Drawing Sheets

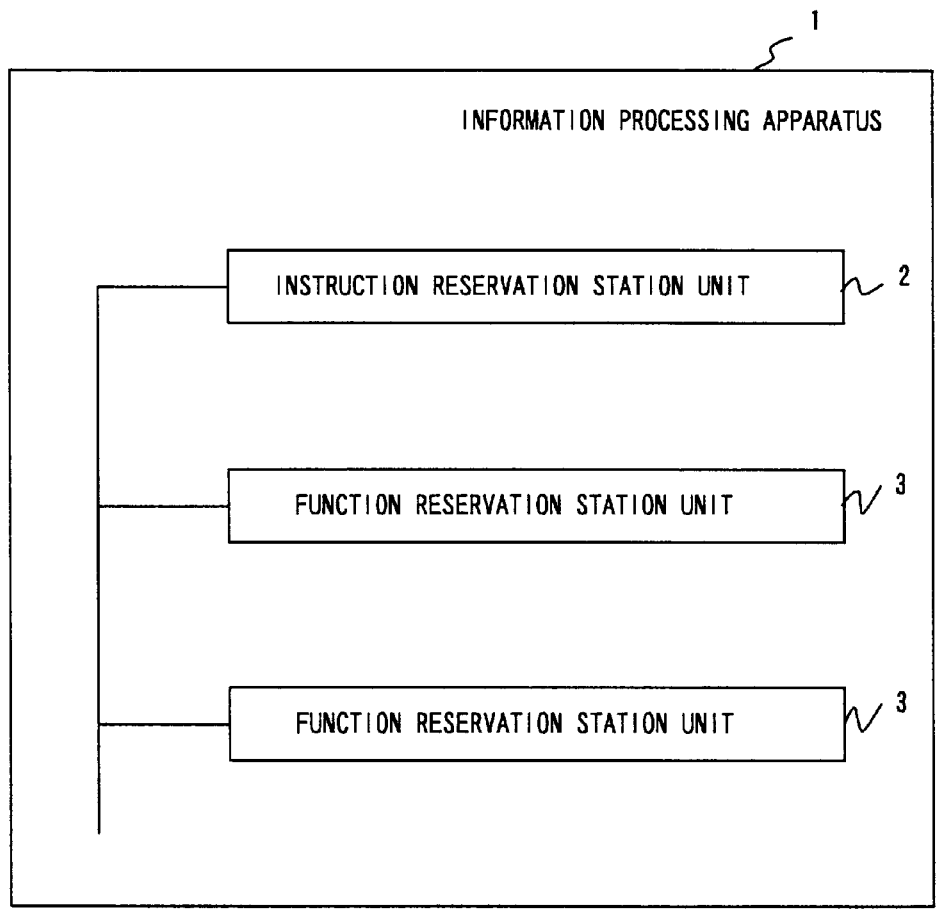
F I G. 1

| V | OPC | E | B | EC | BC | BT | WR | STWA | | CXQC | | |

FIG. 3

| V | IID | OPC | XV | IXA | BV | BSA | D | |

FIG. 4

| V | I ID | OPC | 1V | 1R | R1A | 2V | 2R | R2A | |

F I G. 5

| V | I ID | OPC | M | T/R | TAV | TA |

F I G. 6

| OPC | R1 | X2 | B2 | D2 |
|---|---|---|---|---|

CSE
"1" →V, E, WR, CX
"0" →B, EC, BC, BT, ST, CC,
OPC →OPC
R1 →WA
RSA
"1" →V, XV, BV
IID →IID
OPC →OPC
X2 →IXA
B2 →BSA
D2 →D
RSE
"1" →V, 1V, 2V, 1R
"0" →2R, R2A
IID →IID
OPC →OPC
R1 →R1A

F I G. 1 0

| OPC | R1 | R2 |
|-----|----|----|

CSE
"1" →V, E, WR, CX
"0" →B, EC, BC, BT, ST, CC,
OPC →OPC

RSE
"1" →V, 1V, 2V, 1R, 2R
IID →IID
OPC →OPC
R1 →R1A
R2 →R2A

F I G. 1 1

| OPC | M1 | X2 | B2 | D2 |
|-----|----|----|----|-----|

CSE
  "1" →V, B
  "0" →E, EC, BC, BT, WR, ST, WA, CX, CC,
  OPC →OPC
  R1 →WA

RSA
  "1" →V, XV, BV
  IID →IID
  OPC →OPC
  X2 →IXA
  B2 →BSA
  D2 →D

RSBR
  "1" →V
  "0" →T, R, TAV
  IID →IID
  OPC →OPC
  M1 →M

F I G. 1 2

| OPC | R1 | X2 | B2 | D2 |
|-----|----|----|----|-----|

CSE
  "1"  →V, E, ST
  "0"  →B, WR, WA, CX, EC, BC, BT, CC,
  OPC →OPC

RSA
  "1"  →V, XV, BV
  IID →IID
  OPC →OPC
  X2 →IXA
  B2 →BSA
  D2 →D

RSE
  "1"  →V, 1V, 1R
  "0"  →2V, 2R, R2A
  IID →IID
  OPC →OPC
  R1 →R1A

F I G. 1 3

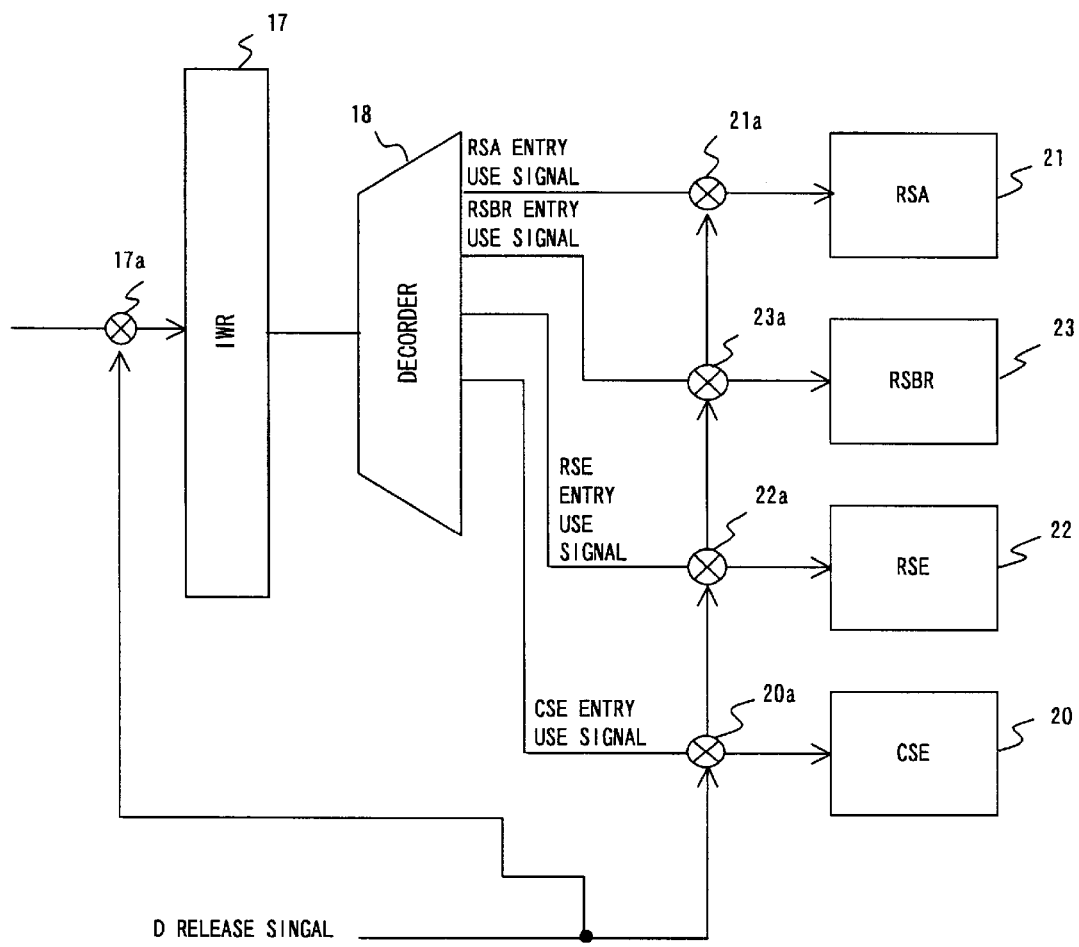
F I G. 1 5

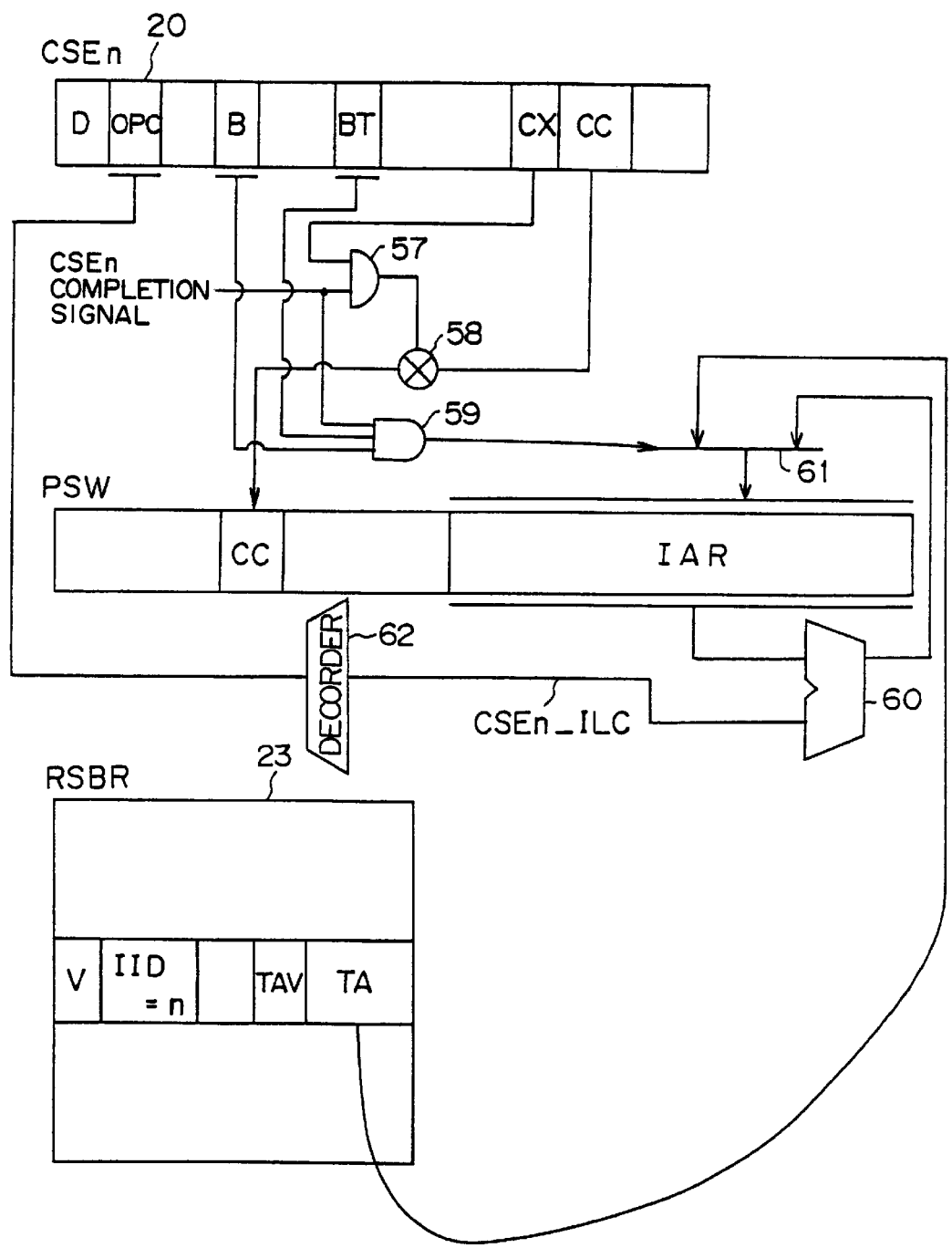
F I G. 18

FIG. 19

| | FIRST INSTRUCTION | SECOND INSTRUCTION | THIRD INSTRUCTION |
|---|---|---|---|
| EXECUTION CYCLE → | E | | |
| | D  P_A | E | |
| | A  P_S | D  P_A | E |
| | T_S | A  P_S | D  P_A |
| | B_S | T_S  P_E | A  P_S |
| | CACHE MISHIT / RE-ACTIVATION | B_S  B_E | T_S  P_E |
| | | R_S  X_E | B_S  B_E |
| | | | R_S  X_E |
| | P_S | | |
| | T_S  P_E | | |
| | B_S  B_E | | |
| | R_S  X_E | | |
| | U | | |
| | W | U | |
| | | W | U |
| | | | W |

# INSTRUCTION PROCESSING APPARATUS

CROSS REFERENCE TO RELATED APPLICATION

This application is a continuation of International PCT Application No. PCT/JP99/02178 filed on Apr. 23, 1999.

BACKGROUND OF THE INVENTION

1. Field of the Invention

The present invention relates to an instruction processing apparatus for sequentially executing instructions, and more specifically to an instruction processing apparatus for sequentially performing operations of referring to and updating resources accessible by a program, that is, a storage area of memory, the contents of a register, etc., in the instruction execution order.

2. Description of the Related Art

In the information processing apparatus, various technologies have been used to quickly perform a process on an instruction. A first technology is a pipeline process. By setting a number of smaller stages in a process, that is, setting a pipeline process, a higher-speed machine cycle can be realized. As a result, a system referred to as a super-pipeline, a super-scalar system in which a plurality of pipelines are mounted, etc. have been put to a practical use as pipeline process technologies.

As a second technology, an instruction is executed and controlled using a stack awaiting a process to be performed and referred to as a reservation station instead of the control of the execution of an instruction by a pipeline. In the system using a reservation station, unlike the pipeline system, the number of entries of a stack can be selected independent of the number of the process steps in a machine cycle unit, and high parallelism can be attained by setting a larger number of entries.

An out-of-order system can be used as a third technology for higher performance. An out-of-order system performs a process in an order different from an instruction order directed by a program, that is, executes instructions from any one, for example, whose input data have been prepared. That is, in the out-of-order system, an entry which can be processed in a stack is selected, and a process corresponding to the entry can be performed in an order different from an instruction order directed by a program.

Although an arbitrary instruction execution order can be set in the out-of-order system, the instructions have to be executed such that the resources accessible by a program, that is, the storage area of memory, the contents of a register, etc. can be referred to or updated according to the program execution order.

A register renaming technology has been suggested as a technology of guaranteeing that the contents of a register can be referred to and updated in the program execution order. In the conventional register renaming process, physical registers larger in number than the logical registers specified by the architecture are prepared, and the logical registers are all mapped corresponding to the physical registers, and then referred to and updated. The physical registers are larger in number than the logical registers because the contents of the physical registers corresponding to the logical registers have to be stored in case a pipeline may be cleared for any reason.

Thus, by increasing the number of entries of a stack in the reservation station system for execution at a higher speed than the pipeline system, the performance of a process per unit clock can be improved, but the amount of hardware also increases. In addition, since the number of function execution units are limited, an entry corresponding a process to be performed has to be selected from among a number of entries to execute an instruction. As a result, with an increasing amount of hardware, the machine cycle is reduced, thereby hardly improving the entire performance.

In the out-of-order system, it is necessary to have a system of performing a process for observing an operation of updating programmable resources, which are maintained regardless of an execution order of an operation process, etc., such as a storage area of memory, the contents of a register, etc. as if the process were performed in an instruction execution order. The system can be, for example, the above mentioned register renaming process. To attain this, the amount of hardware increases, the hardware becomes more complicated, and an enhanced machine cycle can hardly be realized.

Furthermore, to prevent a machine cycle from reducting and a amount of hardware from increasing, the pipeline system is to be combined with the reservation station system so that a process can be divided into a plurality of stages each having a stack. In this method, a stage has to be completed before starting the next stage, and it is difficult to pass control between the stages with the instruction execution order of a program ignored, thereby failing to overcome the limit of the pipeline process system.

SUMMARY OF THE INVENTION

It is therefore one object of the present invention to provide an apparatus that will be capable of executing an instruction at a high speed by independently providing an instruction reservation station storing data, etc. corresponding to the type of an instruction for one instruction, and one or more function reservation stations corresponding to the function relating to the execution of the instruction.

According to the present invention, an apparatus for executing instructions includes: an instruction reservation station unit for storing data for each type of instruction corresponding to an individual instruction, and integrally controlling the update of resources relating to the completion of the execution of the instruction; and one or more function reservation station units for storing data corresponding to the function relating to the execution of the instruction, and controlling the execution of the function according to the integral control performed by the instruction reservation station unit.

According to the present invention, an entry of the instruction reservation station unit corresponding to each instruction, and an entry of one or more function reservation station units corresponding to the function relating to the execution of an instruction are independently generated. Therefore, instructions can be executed from any executable instruction, and the resources can be updated in an instruction execution order, thereby greatly improving the parallelism of the processes, and successfully improving the performance of the instruction processing apparatus.

BRIEF DESCRIPTION OF THE DRAWINGS

The present invention can be more clearly understood by referring to the attached drawings and the detailed explanation described later.

FIG. 1 is a block diagram of the configuration showing the principle of the present invention;

FIG. 3 shows the format of storing data in a commit stack entry (CSE);

FIG. 4 shows the format of storing data in an entry of a reservation station (RSA) for generating an operand address in main storage;

FIG. 5 shows the format of storing data in an entry of a reservation station (RSE) for an operations process;

FIG. 6 shows the format of storing data in an entry of a reservation station (RSBR) for a branching process;

FIG. 10 shows the contents of the data stored as an entry in each reservation station corresponding to an RX-formatted operations instruction;

FIG. 11 shows the contents of the data stored as an entry in each reservation station corresponding to an RR-formatted operations instruction;

FIG. 12 shows the contents of the data stored as an entry in each reservation station corresponding to an RX-formatted branch instruction;

FIG. 13 shows the contents of the data stored as an entry in each reservation station corresponding to a store instruction;

FIG. 15 shows the generation of an entry in each reservation station according to a D release signal;

FIG. 18 shows the process of updating the value of an instruction address register of a program status word when a process corresponding to the release of an entry by the CSE is completed; and FIG. 19 shows the instruction execution order according to the present invention.

DESCRIPTION OF THE PREFERRED EMBODIMENTS

Figure 2:
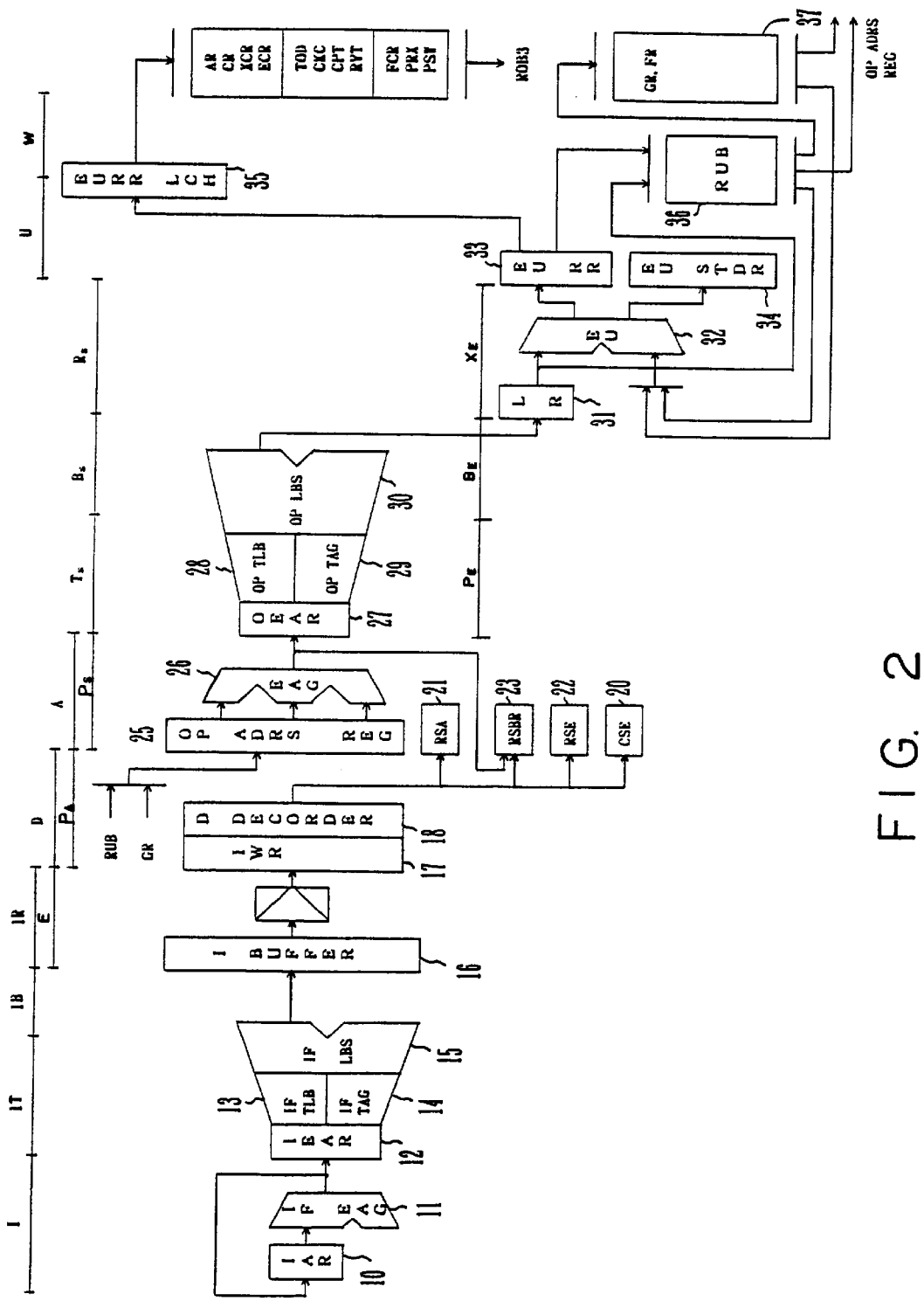
FIG. 2 is a block diagram of the entire configuration of the information processing apparatus provided with an instruction reservation station and a function reservation station according to the present invention.

FIG. 1 is a block diagram of the configuration showing the principle of the present invention. Actually, FIG. 1 is a block diagram of the configuration showing the principle of the information processing apparatus for sequentially executing instructions. An information processing apparatus 1 comprises an instruction reservation station unit 2 and one or more function reservation station units 3.

The instruction reservation station unit 2 stores data for each type of instruction corresponding to an individual instruction, and performing integral control including the update of resources relating to the completion of the execution of the instruction.

The function reservation station unit 3 stores data corresponding the function relating to the execution of an instruction, and controls the execution of the function under the integral control of the instruction reservation station unit 2. For example, a plurality of function reservation station units 3 are provided for plural types of functions.

In FIG. 1, for example, data is stored in at least one entry in the instruction reservation station unit 2 corresponding to one instruction when the execution of the instruction is started, and data is stored in an entry in one or more function reservation station units 3 relating to the use of necessary resources in the execution of the instruction depending on an instruction decoding result.

The entry in the instruction reservation station unit 2 and the entry in the function reservation station unit 3 in which the data corresponding to the function relating to the instruction are correlated by, for example, storing the same identifier.

In FIG. 1, the function reservation station unit 3 stores the data obtained by performing a function in a work register not observed by a program, and programmable resources are not updated by the function reservation station unit 3.

In FIG. 1, the instruction reservation station unit 2 receives a function execution completion report from the function reservation station unit 3, or a function unit controlled by the function reservation station unit 3 in the information processing apparatus, then issues an instruction to update the resources used when the instruction is executed in an instruction execution order, and releases the entries of the instruction reservation station unit 2 and the function reservation station unit 3 storing the data corresponding to the instruction.

Furthermore, in FIG. 1, the function reservation station unit 3 comprises: for example, a reservation station unit for generating a main storage operand address and performing the execution of a process of generating an operand address of main storage; a reservation station unit for performing an operations process and controlling the execution of the operations process; and a reservation station unit for a branching process and controlling the execution of the branching process.

As described above, the present invention comprises the instruction reservation station unit and the function reservation station unit corresponding to the function executed by the instruction.

FIG. 2 is a block diagram of the entire configuration of the information processing apparatus comprising an instruction reservation station and a function reservation station according to the present invention.

In FIG. 2, an instruction address register (IAR) 10, an instruction fetch effective address generator (IFEAG) 11, an instruction effective address register (IEAR) 12, an instruction fetch translation look aside buffer (IFTLB) 13, an instruction fetch tag (IFTAG) 14, and an instruction fetch local buffer storage (IFLBS) 15 perform an operation of an instruction fetch pipeline as a partial pipeline in the information processing apparatus according to the present invention.

The instruction fetch pipeline comprises an instruction fetch request issue cycle I, an access cycle IT to a tag and a TLB, a buffer access cycle IB, and a fetch completion cycle IR. An instruction fetched from the main storage is provided for an instruction buffer 16.

The instruction provided for the instruction buffer 16 is decoded by an instruction word register (IWR) 17 in an instruction decode pipeline, and a decoder 18. The pipeline comprises a presentation cycle E and a decode cycle D of an instruction.

An entry is generated in a commit stack entry (CSE) 20 corresponding to an instruction reservation station when the decode cycle terminates (D release), and entries required for: a reservation station for address generation (RSA) 21 corresponding to the reservation station for generating a main storage operand address; a reservation station for execution (RSE) 22 corresponding to the reservation station for an operations process; and a reservation station for branch (RSBR) 23 corresponding to the reservation station for a branching process are generated corresponding to an instruction decode result.

Normally, the number of entries in the RSA 21, the RSE 22, and the RSBR 23 is smaller than the number of entries in the CSE 20. For example, the number of entries is 16 for the CSE 20, 6 for the RSA 21, 8 for the RSE 22, and 4 for the RSBR 23.

If there is no empty entry in the function reservation station in which an entry is to be made as a result of an instruction decoding process after the completion of a decode cycle (D release), then the instruction is held at the IWR 17, and when there arises a space in a necessary entry, an entry is generated in the CSE 20 and a necessary reservation station. In this connection, a resource counter described later is prepared corresponding to each function reservation station. When an entry is generated, the value is incremented. When the process corresponding to the execution is completed, the value of the pointer is decremented.

An in-pointer described later is provided for the CSE 20, and the number of the entry generated in the CSE 20 at the end of the decode cycle is indicated by the value of the in-pointer, and the number is entered in the corresponding entry in each function reservation station as an instruction identifier (IID), and is used to uniquely identify the instruction being processed together with the instruction execution order.

The reservation station RSBR 23 for a branching process is also provided with an in-pointer different from the in-pointer for the CSE 20, and an entry is generated at the position indicated by the in-pointer. Since an out-of-order process is basically performed on the RSA 21 and the RSE 22, an empty entry is searched for and generated in the reservation station.

The CSE 20 is provided with an out-pointer which is incremented when the entry is released, and the leading entry pointed to by the out-pointer is identified as the first to be completed in the instructions being executed. The programmable resources to be executed before the release of entries are updated in order from the instruction pointed to by the out-pointer, thereby guaranteeing the update order of the resources in the instruction execution order.

The RSBR 23 is provided also with an out-pointer, but a branch is determined in an out-of-order process. On the other hand, a branch completion report for the CSE 20 is sequentially issued from the entry pointed to by the out-pointer The processes on the entries in the RSA 21 and the RSE 22 are performed in order from any executable entry. When there are a plurality of executable entries, they are processed in order from the entry relating to the first executed instruction.

In FIG. 2, after the operation of the pipeline of instruction decode (E-D), an address computation pipeline, a storage control (S) unit (cache access) pipeline, a pipeline for performing operations, and a pipeline for updating resources are processed as necessary.

The pipeline for computing an address comprises an address generation priority cycle PA, and an address generation cycle A. The pipeline of the S unit comprises a priority cycle Ps, an access cycle Ts to a tag and a TLB, a buffer access cycle Bs, and a completion cycle Rs. The pipeline for performing operations comprises a priority cycle P$\epsilon$, a buffer access cycle B$\epsilon$, and an execution cycle X$\epsilon$. The resource update pipeline comprises an update cycle U and a write cycle W.

The processes performed using these pipelines are described later only about the portions related to the present invention. Described below are the operations of entries for the CSE 20 as an instruction reservation station according to an embodiment of the present invention, the RSA 21, the RSE 22, and the RSBR 23 as function reservation stations.

Figure 3:
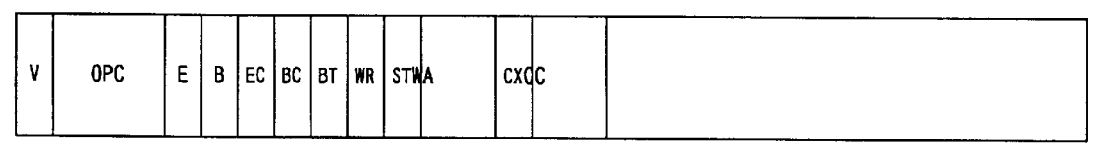

FIG. 3 shows the format of storing data in each entry in the commit stack entry (CSE) 20 shown in FIG. 2. Each entry of the CSE 20 stores a bit V indicating whether or not the entry is valid, an operation code (OPC), E indicating whether or not an operations process is performed on the instruction, B indicating whether or not it is a branch instruction, EC indicating the completion of an operations process if it is performed, BC indicating the completion of a branch, BT indicating the selection of a branch, WR as a write tag indicating whether or not a register is updated, ST indicating whether or not data is stored in the main storage, WA as a register number when a register is updated, CX indicating whether or not a condition code is changed, and CC as a condition code.

When an entry is generated during the instruction decoding process, the contents of V, OPC, E, B, WR, WA, ST, and CX are set.

When an entry is executed, a completion report is issued from an operations unit with an IID when, for example, an operation is completely performed. In response to this, an EC bit in the entry is set, and a condition code (CC) is set as necessary. When a branching process is completed, a completion report is issued with an IID from the RSBR 23, and a branch completion bit BC and, depending on a branch result, a branch selection bit BT are set.

Assuming that the E bit of 0 indicating that no operations are performed, or the EC bit of 1 indicating that operations have been completed is defined as the first condition, and that the B bit of 0 not indicating a branching process, or the BC bit of 1 indicating the completion of a branching process is defined as the second condition, it is determined that the process performed by the corresponding instruction on the entry in the CSE 20 has been completed when the first and the second conditions are satisfied.

When the conditions are satisfied for the entry of the CSE 20 pointed to by the value of the out-pointer, the resources relating to the entry are updated (corresponding to the pipeline for updating the resources), and the entry is released. When the WR bit of the entry is 1, data is written to a register indicated by WA, for example, a general-purpose register (GR) (or a floating point register (FR)) 37, that is, a write of data stored in a register update buffer (RUB) 36 as a work register is indicated. When the ST bit is 1, a write of data stored in the store buffer (STB) storing store data to the main storage is indicated.

When the resources are updated, the update of the value of the instruction address register (PSWIAR) of a program status word indicating the address of an instruction to be executed is indicated. If the B bit of an entry is 0 not indicating a branch instruction or the BT bit is 0 no indicating a branch, then the value of the PSWIAR is incremented by the length of an instruction word depending on the OPC of an entry. If the B bit is 1 and the BT bit is 1, that is, if a branch is selected by a branch instruction, then the target address (TA) of an entry having a matching IID in the RSBR 23 described later, that is, the target address, is read, and the value of the PSWIAR is replaced using the value.

Furthermore, the RSBR 23 is notified of the release of the entry of the CSE 20, the V bit of the entry having a matching IID is set to 0, the entry of the RSBR 23 is released, the value of the resource counter for the CSE 20 is decremented, and the value of the out-pointer is incremented.

Figure 4:
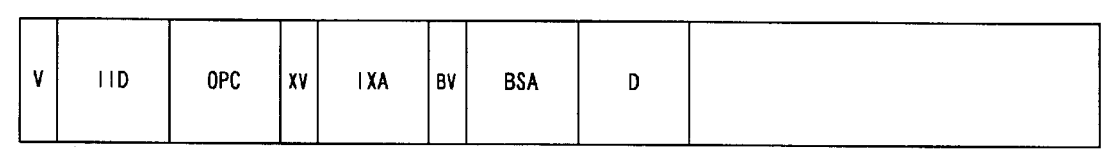

For the reservation station for the main storage operand address generating process (RSA) 21, an entry is generated when it is necessary to generate a main storage operand address as a result of decoding an instruction. FIG. 4 shows the data storage format in the entry. The entry stores a valid bit V indicating whether or not the entry is valid, the above mentioned instruction identifier IID, an instruction code (OPC), an index valid (XV) indicating whether or not an index register is to be used, a base valid (BV) indicating whether or not a base register is to be used, a number of a base register (BSA) when a base register is used, and the value of displacement (D, but 0 when it is not used). These values are all set when an entry is generated corresponding the result of decoding an instruction.

The RSA 21 checks whether or not the register to be used, for example, it checks whether or not an index register, a base register, etc. are available. The condition that the resisters are not available is that an instruction precedent to a target instruction has reserved the update of the contents of a register, and the update has not been completed yet.

When a register to be used is available, it is determined that a process on the entry can be performed. The RSA 21 selects an entry by prioritizing the entry corresponding to the first executed instruction from the entries which can be processed, requests to read data from the register stack according to the values of the XV, BV, IXA, and BSA of the entry, and instructs an effective address generator (EAG) 26 to generate an address using the values of the OPC, IID, and D.

A process on an entry requiring a currently unavailable register is set later in the instruction execution order regardless of its order. That is, the process of the RSA 21 is basically out of order. When the above mentioned process (corresponding to the pipeline of computing an address) is completed, the RSA 21 issues a process completion report to the CSE 20. The V bit of the entry is set to 0, the entry is released, and the value of the resource counter corresponding to the RSA 21 is decremented.

At an instruction from the RSA 21, the EAG 26 generates a main storage operand address by adding up the value of the received index register, the value of the base register, and the value of D directly transmitted from the RSA 21, and issues a fetch or store request with an IID according to the OPC to the storage control unit, that is, the S unit. Furthermore, it reports to the RSBR 23 that the main storage operand address has been generated with an IID. That is, an operand address is provided for the RSBR 23 as a target address.

The S unit performs a process requested by the EAG 26. When the request is a fetch (corresponding to the pipeline of cache access) request, the RSE 22 is notified of a status valid (STV) signal and an IID corresponding to the request when the main storage data has been completely fetched. When the request is a store request, the RSE 22 is notifies of the STV signal and the IID, and control is passed to a wait for storage state. When it is reported with an IID from an operations unit that store data is set in a store data register EUSTDR 34, the data is fetched to a store buffer (STB), and then a write to the main storage operand is performed at an instruction from the CSE 20.

Figure 5:
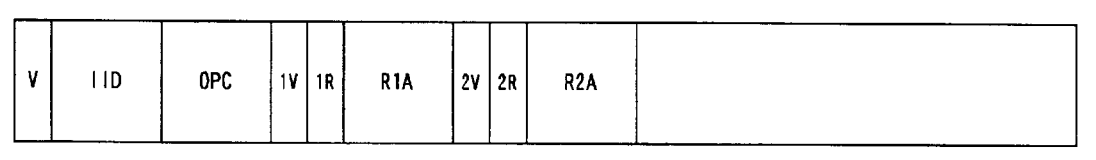

For the RSE 22, an entry is generated when an operation process (corresponding to a pipeline of performing an operation) by an operations unit (E unit) is required. FIG. 5 shows the data storage format in the entry. When an entry is generated, a valid bit (V), IID, OPC, 1V indicating whether or not the first operand is to be used, 1r indicating whether or not the first operand, if it is used, is a register operand, the register number R1A when it is a register operand, 2V whether or not the second operand is to be used, 2R indicating whether or not the second operand, if it is used, is a register operand, and the register number R2A when it is a register operand are set in the entry according to a result of encoding an instruction.

The RSE 22 checks whether or not the operand to be used is available. When it is available, an entry is selected by prioritizing the entry corresponding to the first executed instruction, and the process corresponding to the entry is started. The availability determination when a register operand is specified is the same as the determination for the RSA 21. On the other hand, for a main storage operand, it is recognized that an operand has become available by an STV signal with an IID from the S unit. The process on an entry requiring an unavailable operand is set later in the instruction execution order regardless of its order. That is, the process in the RSE 22 is basically out or order.

When the RSE 22 starts its process, it issues a read request to the register stack based on the values of 1V, 2V, 1R, 2R, R1A, and R2A in the entry, and provides the read data for the input terminal of the E unit. For a main storage operand, input data is provided at an instruction from the S unit, and the RSE 22 issues an instruction with an IID to an operations unit to perform operations. When the RSE 22 completes the above mentioned processes, it releases the V bit of the entry by setting it to 0, and decrements the value of the resource counter corresponding to the RSE 22.

When the operations unit completes the operations in response to the instruction from the RSE 22, it stores data as a result of the operations in the work register (RUB) 36, and issues to the CSE 20 a completion report with an IID and a condition code as necessary. For example, when a comparison instruction is executed, the CSE 20 is notified of the completion of operations and the condition code of the result. When the instruction corresponding to the IID is a store instruction, data is set in the EUSTDR 34, and a notification is issued with the IID to the S unit.

Figure 6:
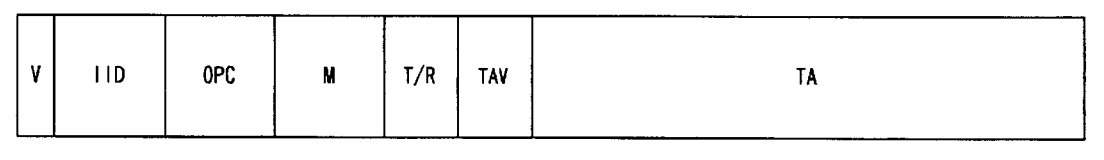

For the RSBR 23, an entry is generated when a branch instruction is executed. FIG. 6 shows the storage of data in the entry. When an entry is generated, valid bits V, IID, OPC, and a condition code mask (M) for a conditional branch are set based on the result of decoding an instruction. In a conditional branch instruction, 4 bits of a mask field correspond to the values 0, 1, 2, and 3 of a condition code. If the value of the condition code corresponds to the bit of 1 of the mask field, then a branch is selected. For example, if the 4 bits of a mask field is '1000', and the condition code=0, then the branch is selected.

When the EAG 26 reports with an IID that a target address is requested, the validity indicator (TAV) of the target address (target address (TA)) of an entry having the IID is set to 1, and TA is set in the address data.

The determination of a branch, that is, the selection of a branch, or the determination of a non-branch are immediately made when a branch is unconditionally selected, and are made after the condition code can be referred to when a branch is selected depending on a condition, for example, a condition code. When a condition is referred to by a condition code, there are no incomplete instructions which appear earlier than a target instruction in the instruction order and update condition codes, or operations of instructions closest to the target instruction have been completed and the condition codes have been determined. It can be confirmed in the CSE 20 by combining the CX bit with the EC bit in the valid entry earlier than the target instruction in the instruction execution order.

When a branch is determined, a T/R bit is set depending on whether or not the branch is selected. When the branch is selected, T=R=1. When the branch is not selected, T=0 and R=1.

When a branch is determined, and a branch is not selected, that is, T=0 and R=1, or the branch is selected (T=R=1) and the target address is valid (TAV=1), the RSBR 23 issues a completion report about the entry with an IID to the CSE 20.

The entry of the RSBR 23 is released and the value of the resource counter is updated by an instruction from the CSE 20. Before receiving the instruction, the entry in the RSBR 23 to be released is incomplete and set in a wait state because the RSBR 23 stores the bit indicating whether or not a branch is selected and its target address, and the CSE 20 retrieves from the RSBR 23 the information about the first branch in the execution order according to the pointer value of the out-pointer corresponding the RSBR 23 for use in the instruction completing process, and indicates the release of an entry corresponding to the RSBR 23.

Figure 7:
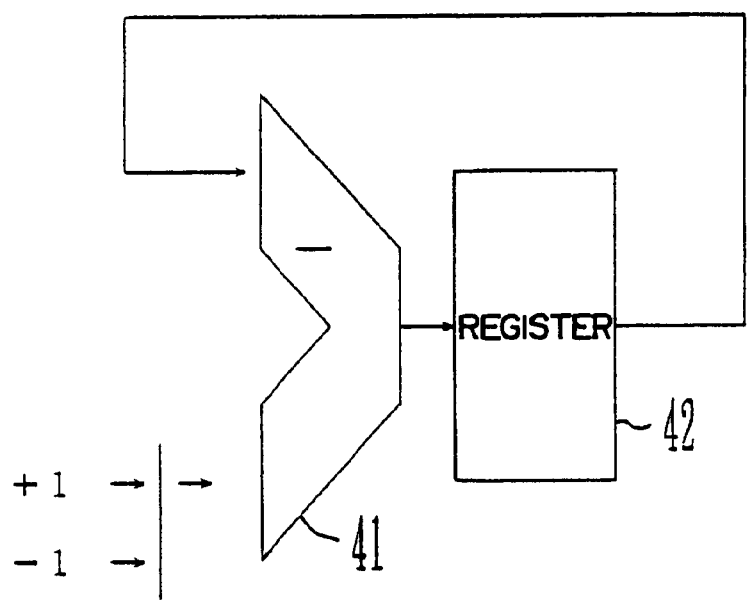
FIG. 7 is a block diagram of the configuration of a resource counter provided in each reservation station.

FIG. 7 is a block diagram of the configuration of the resource counters provided for the CSE 20, the RSA 21, the RSE 22, and the RSBR 23. In FIG. 7, the resource counter comprises a adder 41 and a register 42. Each time an entry is generated in each reservation station, the output of the adder 41 is incremented, and the addition result, that is, the number of entries, is stored in the register 42. When an entry is released, an addition result is decremented and stored in the register 42.

Figure 8:
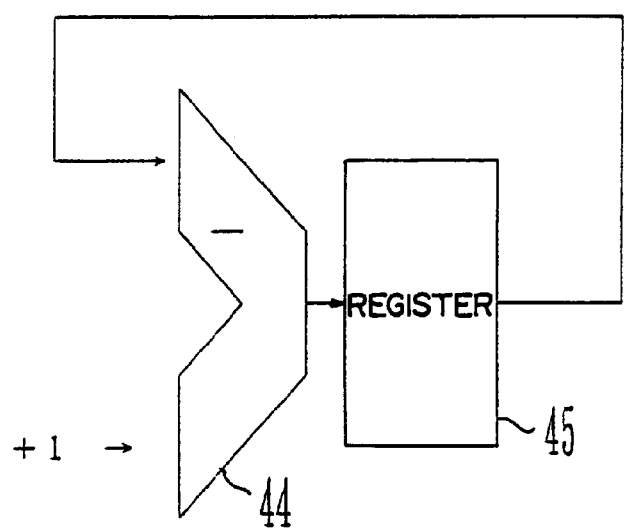
FIG. 8 is a block diagram of the configuration of an in-pointer for the SCE and the RSBR.

FIG. 8 is a block diagram of the configuration of the in-pointer provided for the CSE 20 and the RSBR 23. As with the resource counter, it comprises an adder 44 and a register 45. Each time an entry is generated in a reservation station, the addition result of the adder 44 is incremented, and stored in the register 45.

Figure 9:
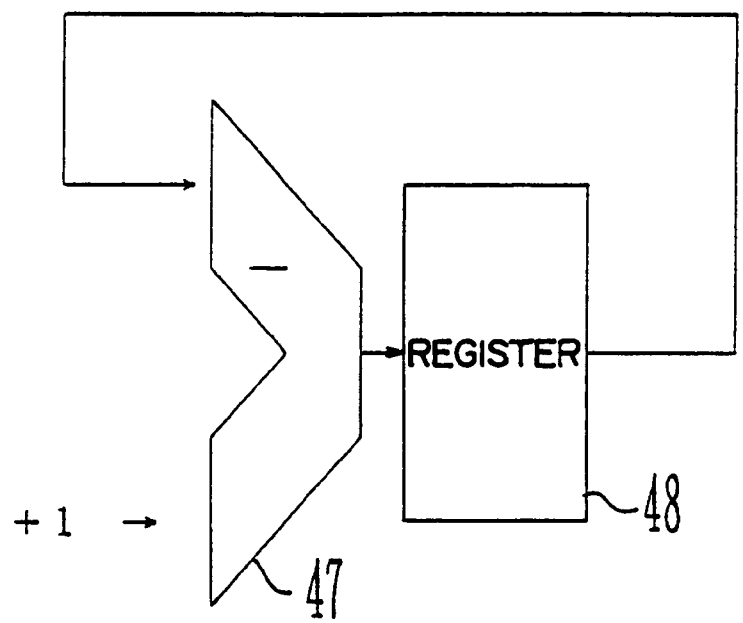
FIG. 9 is a block diagram of the configuration of an out-pointer for the CSE and the RSBR.

FIG. 9 is also a block diagram of the configuration of the out-pointer provided for the CSE 20 and the RSBR 23. As with the in-pointer shown in FIG. 8, it comprises an adder 47 and a register 48. Each time an entry is released, the addition result of the adder 47 is incremented and stored in the register 48, and an entry specified by the value of the out-pointer for the CSE 20 is the first executed instruction in the incomplete instructions being executed.

In response to a practical instruction, the contents stored in the entry of each reservation station is described below by referring to FIGS. 10 through 13. FIG. 10 shows the contents of the data stored as an execution in each reservation station corresponding to an RX format operation instruction (addition, subtraction, etc.). This instruction is executed to store in the register R1 the operation result of the contents of the register R1 and the contents of the main storage operand address specified by the X2, B2, and D2. An entry is generated in each of the CSE 20, the RSA 21, and the RSE 22, and the entries store the contents as shown in the figures. No entry is generated in the RSBR 23. In the entry of the CSE 20, the value of the EC is set to 1 when an operation completion report is issued from the operations unit. Simultaneously, the condition code CC is set.

FIG. 11 shows the contents of the data stored as entries in the CSE 20 and the RSE 22 corresponding to an RR format operation instruction (addition, subtraction, etc.). This instruction is executed to store the operation result of the contents of the registers R1 and R2. No entry is generated by the instruction in the RSA 21 and the RSBR 23. The EX in the entry of the CSE 20 is set to 1 when an operation completion report is issued from the operations unit as shown in FIG. 10. Simultaneously, a condition code CC is set.

FIG. 12 shows the contents of the data stored as an entry in each reservation station corresponding to an RX format branch instruction (branch on condition, etc.). An entry is generated in the CSE 20, the RSA 21, and the RSBR 23, but no entry is generated for the RSE 22. For the BC in the entry of the CSE 20, the value is set to 1 when a branch completion report is issued from the RSBR 23, and the BT is also set to 1 when a branch is selected. For the TAV in the entry of the RSBR 23, the value is set to 1 when an address generation report is issued from the EAG 26. Simultaneously, the value of the target address TA is set.

FIG. 13 shows the contents of the data stored as an entry in each reservation station corresponding to a store instruction. When this instruction is executed, the contents of the register R1 are stored at the main storage operand address specified by the X2, B2, and D2. For this instruction, an entry is generated in the CSE 20, the RSA 21, and the RSE 22, but no entry is generated for the RSBR 23. For the EC in the entry of the CSE 20, the value is set to 1 when an operation completion report is issued from the operations unit.

Figure 14:
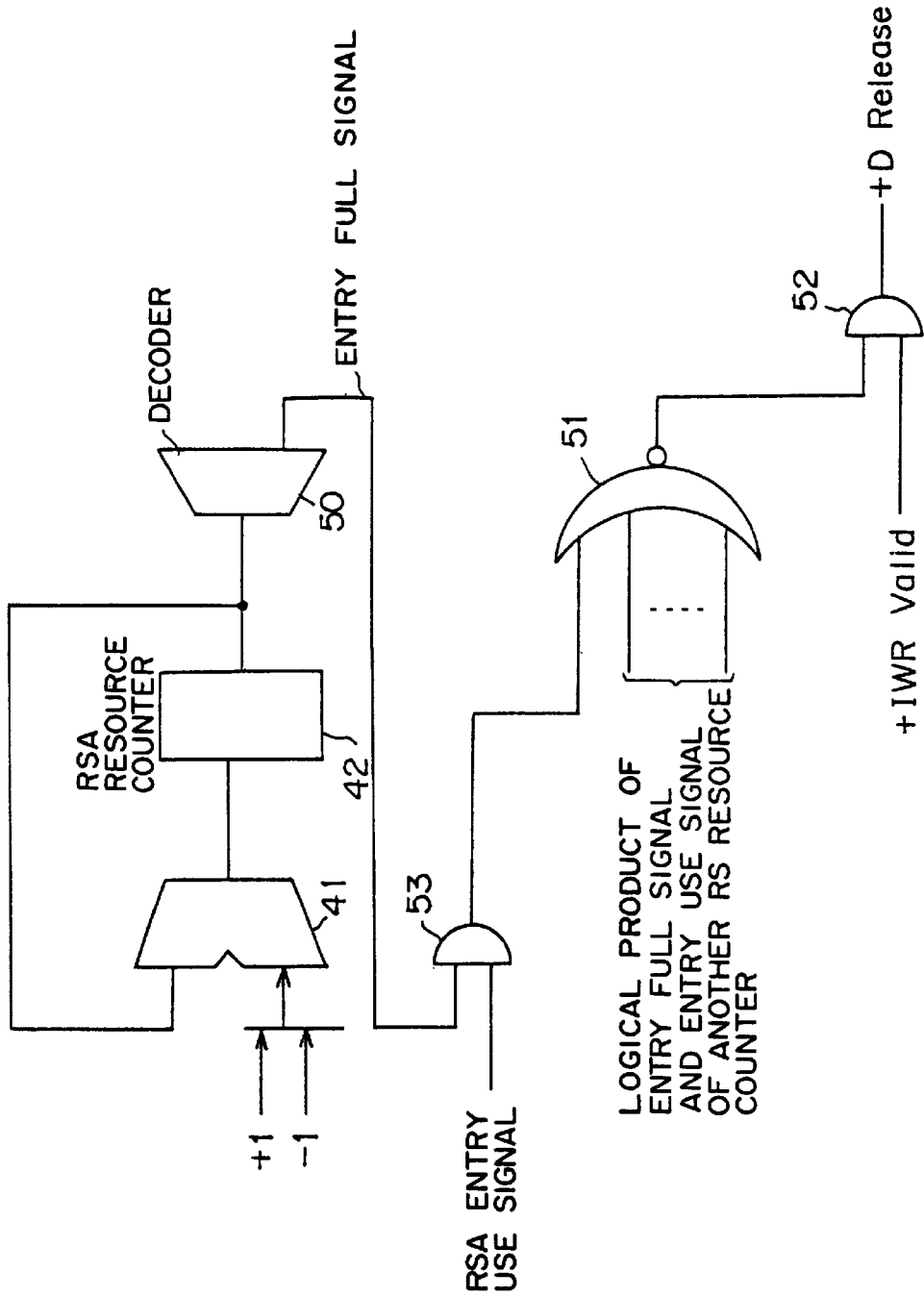
FIG. 14 shows a block diagram of a circuit for generating a resource counter and a D release signal corresponding to each reservation station.

The process of generating an entry in each reservation station shown in FIG. 2, the process performed when an instruction for generating an entry in the CSE 20 is completed, etc. are described below in detail by referring to FIGS. 14 through 18. FIG. 14 is a block diagram of the circuit for generating a D release signal for generation of an entry in each reservation station. As described above, when there is no space for an entry in a necessary reservation station, and no entry can be generated, the instruction is maintained in the instruction word register (IWR) 17. However, when there is a space for an entry, a necessary execution can be generated in each reservation station when a D release signal is output.

In FIG. 14, when an output of the register 42 in the resource counter for each reservation station is the value indicating that the entry is full, an entry full signal is output by a decoder 50. In this example, only an RSA resource counter is shown, but the entry full signal is input to an AND gate 53 with an RSA entry USE signal (output of the decoder 18) indicating that the RSA is used as a result of decoding the contents stored in the IWR 17, and the output of the AND gate 53 is input to a NOR gate 51 with a logical product of an entry full signal of another resource counter and an entry USE signal, that is, the output of the AND gate similar to the AND gate 53. The output of the NOR gate 51 is provided for an AND gate 52 with an IWR valid signal indicating that the instruction word register (IWR) 17 stores a valid instruction. An output of the AND gate 52 indicates an H level when a logical product of an entry full signal corresponding to all reservation stations and an entry USE signal indicates an L level and an IWR valid signal indicates the H level. Then, the output is a D release signal.

FIG. 15 shows that an entry is generated in each reservation station in response to an input of a D release signal. In FIG. 14, when a logical product of an entry full signal corresponding to all reservation stations and an entry USE signal indicates an L level and an IWR valid signal indicates the H level, a D release signal is provided for in-gate control circuits 20a through 23a provided between the decoder 18 and each reservation station. According to an entry USE signal of each reservation station as a result of a decoding process by the decoder 18, data is stored in a necessary entry for the CSE 20 through RSBR 23. The D release signal is also provided for an in-gate control circuit 17a provided at the precedent stage of the IWR 17, and a subsequent instruction word is stored in the IWR 17.

Figure 16:
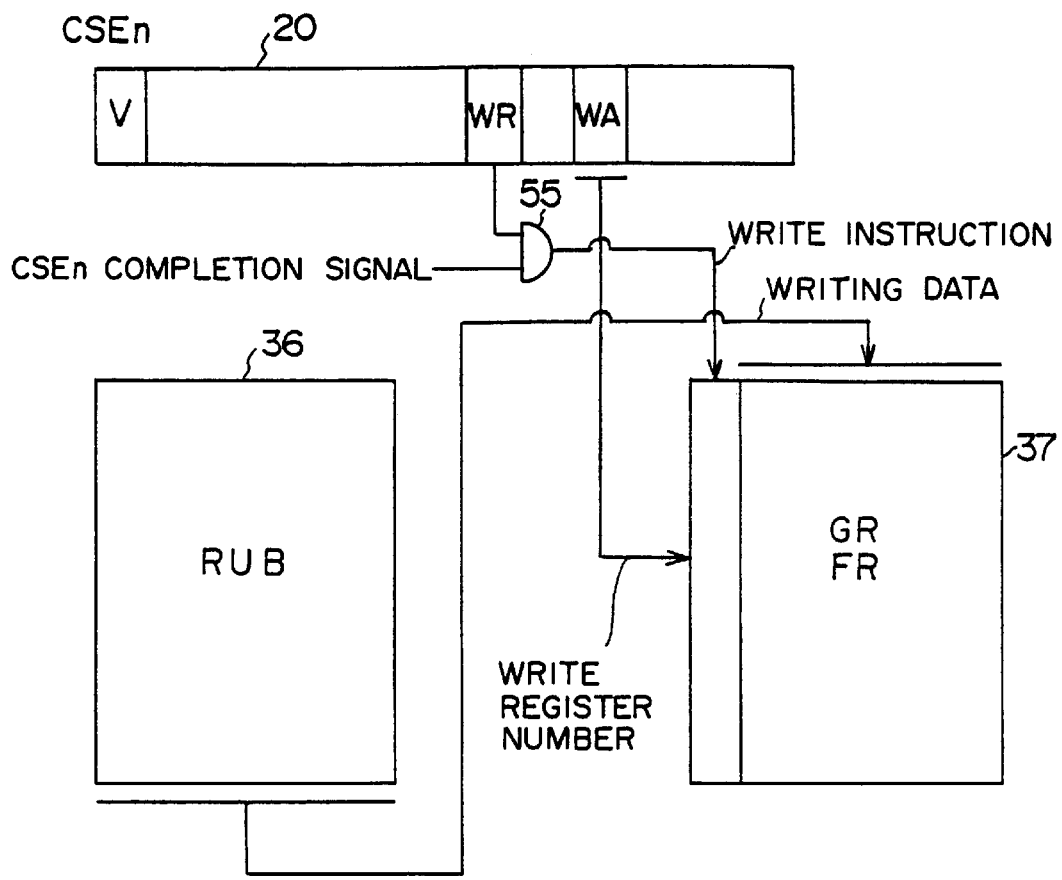
FIG. 16 shows the process of updating the resources relating to the entry of the CSE and releasing the entry when an operation is completed.

FIG. 16 shows the process of updating the resources for an entry of the CSE and releasing an entry when an operation is completed. If the WR bit of the n-th entry 20 of the CSE is 1, then the output of an AND gate 55 indicates the H level when an operation completion signal corresponding to the n-th entry is input. This signal is provided for a general-purpose register (GR) (or a floating point register (FR)) 37 as a write instruction signal. Then, the data stored in the register update buffer (RUB) 36 as a work register is written to the register indicated by the WA.

Figure 17:
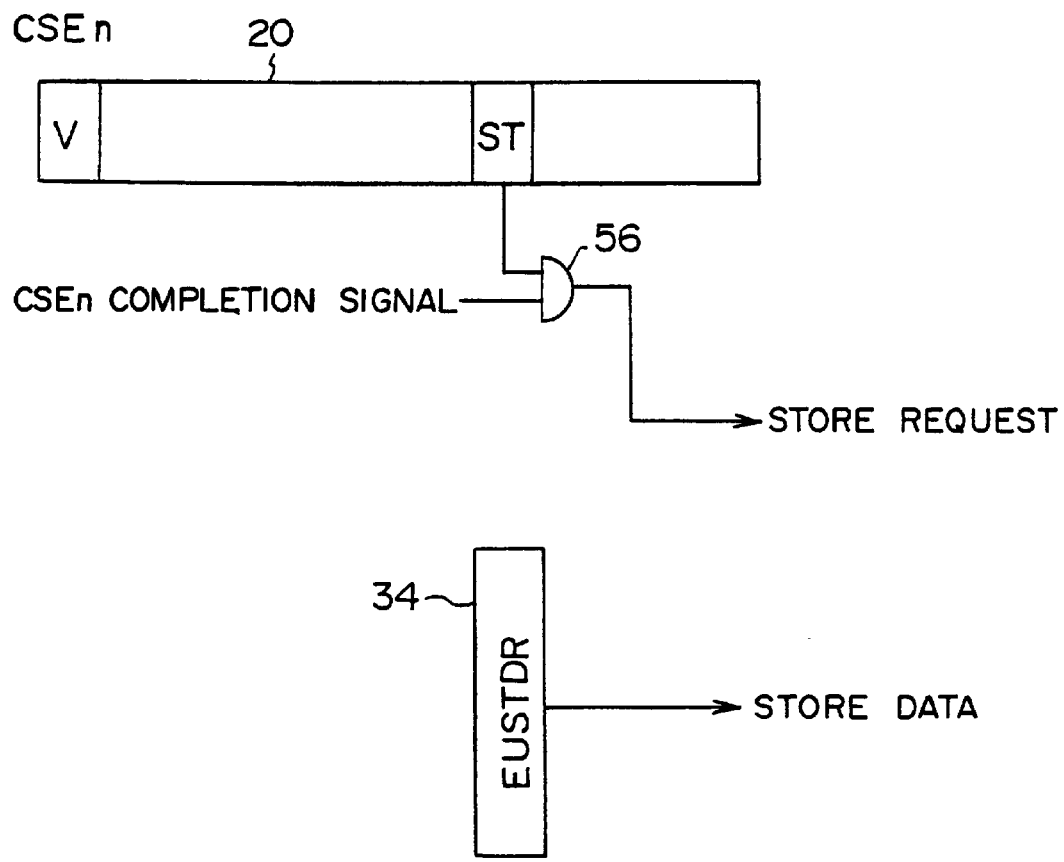
FIG. 17 shows the process of writing store data to the main stooge when the CSE releases an entry.

FIG. 17 shows a process of writing store data to the main storage when an entry of the CSE is released. If the ST bit of the n-th entry 20 of the CSE is 1, then a store request is issued from an AND gate 56 to the main storage by inputting an operation completion signal corresponding to the entry, and the data stored in the store data register (EUSTDR) 34 of the operations unit is output as store data to the main storage.

FIG. 18 shows the process of updating the value of the instruction address register of the program status word performed when an entry of the CSE is released. If the CX bit is 1 when an operation completion signal for the n-th entry 20 of the CSE is input, then an output of an AND gate 57 indicates the H level, the output is provided for an in-gate control circuit 58, and the condition code CC stored in the n-th entry is written to the condition code storage area (CC) of the program status word (PSW) through the in-gate control circuit 58.

On the other hand, the value of the instruction length code (ILC), which is stored in the OPC of the n-th entry 20 of the CSE and depends on the result of a decoding process performed by a decoder 62 of an instruction word, that is, the value of the code indicating the length of an instruction word, is added to the value of the current instruction address register (IAR) by an adder 60, and the addition result is provided for the IAR again through a selector 61.

When a branch is selected by a branch instruction, the value of '1' of the B and BT bits of the n-th entry 20 of the CSE is provided with an operation completion signal for an AND gate 59, and the output of the AND gate 59 controls the selector 61 such that a target address (TA) stored in the entry of the RSBR 23, that is, a branch target address, can be selected, and the branch target address is stored in the IAR.

FIG. 19 shows the instruction execution order and the resource update order according to the present invention. In FIG. 19, the higher three instructions are sequentially provided for the instruction buffer 16 shown in FIG. 2. For the first instruction, there arises an unsuccessful hit in the cache in the pipeline for a storage control unit (S unit), and an actual operation is delayed to wait for the data transfer from the main storage.

Since there arises a hit in the cache with the second and third instructions, and the operations are immediately performed, the execution of these instructions terminates before the re-activation of the first instruction. However, since the processes of the U and W as a pipeline of updating the resources are performed in the instruction execution order, the processes for the second and third instructions are performed after performing the above mentioned processes for the first instruction.

In the explanation above, a D release signal is output for one instruction per cycle, and an entry is generated in each reservation station for each instruction according to the embodiment of the present invention. However, it is also possible to simultaneously provide a plurality of instructions for an instruction word register, update the value of the in-pointer corresponding to the CSE by 2 or more at a time, and simultaneously generate a plurality of entries corresponding to a plurality of instructions.

In this case, it is also necessary to add the function of updating the values of the resource counter and the out-pointer. However, there arise no specific differences in the operation of each reservation station between the case in which a plurality of entries are simultaneously generated for a plurality of instructions and the case in which an entry is generated for each instruction.

It is also possible to generate an address and perform operations by providing a plurality of effective address generators and operations units, and simultaneously selecting a plurality of executable entries from each of the function reservation stations. Also in this case, there arise no specific differences in the operation of each reservation station except that a plurality of entries are simultaneously selected. Furthermore, it is possible to simultaneously terminate a plurality of instructions by extending the function of the CSE and simultaneously adding the lengths the instruction words of instructions corresponding to a plurality of entries when the PSWIAR is updated.

What is claimed is:

1. An apparatus for executing instructions, comprising:
an instruction reservation station unit storing data corresponding to each type of instruction, and integrally controlling update of resources when the instruction is completely executed; and
one or more function reservation station unit storing data corresponding to a function relating to execution of the instruction, and controlling execution of the function under the integral control by said instruction reservation station unit,
wherein said function reservation station unit stores data obtained by executing a function under control of said function reservation station unit in a work register not observed by a program to prevent the update of the resources by the control of said instruction reservation station unit.

2. The apparatus according to claim 1, wherein
said instruction reservation station unit stores the data in at least one entry in said instruction reservation station unit for one instruction when the execution of the instruction is started; and
said function reservation station unit stores the data in an entry in one or more function reservation station units relating to a use of necessary resources for the execution of the instruction, and related to an entry in said instruction reservation station unit based on a result of decoding the instruction.

3. The apparatus according to claim 2, further comprising:
available entry number count unit counting a number of entries which have already stored data in said instruction reservation station unit, and a number of entries which have already stored data in each of said function reservation station units, wherein when the execution of the instruction is started and there is no space in either at least one entry in the instruction reservation station unit corresponding to the instruction or an entry in one or more function reservation station units, and the data cannot be stored in either of the entries, said information processing apparatus the start of the execution of the instruction is delayed until when an entry which currently cannot store the data becomes available.

4. The apparatus according to claim 2, wherein:

a number of entries in each of said function reservation station units is equal to or smaller than a number of entries in said instruction reservation station unit; and each entry in each of said function reservation station units stores a same identifier as an entry in said instruction reservation station unit relating to execution of one instruction and in another function reservation station unit.

5. The apparatus according to claim 1, wherein after receiving a function execution completion report from said function reservation station unit, or from a function unit controlled by said function reservation station unit in said information processing apparatus, said instruction reservation station unit issues an instruction to update resources used when an instruction is executed in an instruction execution order, and releases entries of said instruction reservation station unit and said function reservation station unit storing data corresponding to the instruction.

6. The apparatus according to claim 1, wherein said function reservation station unit comprises:

a main storage operand address generation reservation station unit controlling execution of a process of generating an operand address in main storage;

an operations process reservation station unit controlling execution of an operations process; and a branching process reservation station unit controlling execution of a branching process.

7. An apparatus for executing instructions, comprising:

instruction reservation station means for storing data corresponding to each type of instruction, and integrally controlling update of resources when the instruction is completely executed; and one or more function reservation station means for storing data corresponding to a function relating to execution of the instruction, and controlling execution of the function under the integral control by said instruction reservation station means, wherein said function reservation station means stores data obtained by executing a function under control of said function reservation station means in a work register not observed by a program to prevent the update of the resources by the control of said instruction reservation station means.

8. A method for executing instructions, comprising:

storing, with an instruction reservation station unit, data corresponding to each type of instruction, and integrally controlling update of resources when the instruction is completely executed; and storing, with one or more function reservation station units, data corresponding to a function relating to execution of the instruction, and controlling execution of the function under the integral control by the instruction reservation station unit, wherein the function reservation station unit stores data obtained by executing a function under control of the function reservation station unit in a work register not observed by a program to prevent the update of the resources by the control of the instruction reservation station unit.

* * * * *